United States Patent
Vanderschaaf (12)

(10) Patent No.: US 6,253,213 B1
(45) Date of Patent: Jun. 26, 2001

(54) METHOD AND SYSTEM FOR AUTOMATICALLY MAINTAINING DATA CONSISTENCY ACROSS VARIOUS DATABASES

(75) Inventor: Neil Ray Vanderschaaf, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,922

(22) Filed: Feb. 22, 1999

(51) Int. Cl.$^7$ .................................................. G06F 17/30
(52) U.S. Cl. ........................ 707/203; 707/201; 707/10; 345/349; 709/227; 709/217
(58) Field of Search ..................... 707/203, 201, 707/202, 10, 9, 102, 204, 1–4; 703/19, 22, 14; 709/200, 202, 238, 217, 208, 247, 203, 227, 224, 503, 218; 345/349

(56) References Cited

U.S. PATENT DOCUMENTS

| | | | |
|---|---|---|---|
| 4,855,906 | * | 8/1989 | Burke ...................................... 707/10 |
| 5,551,055 | | 8/1996 | Matheny et al. ...................... 395/882 |
| 5,812,130 | * | 9/1998 | Van Huben et al. ................ 345/339 |
| 5,995,980 | * | 11/1999 | Olson et al. .......................... 707/201 |
| 6,061,683 | * | 11/1999 | Alonso ..................................... 707/8 |
| 6,098,078 | * | 8/2000 | Gehani et al. ....................... 707/203 |

OTHER PUBLICATIONS

Design Data Management in a CAD Framework Environment, By Lung–Chun Liu, Jun. 24–28, 1990, 27th ACM/IEEE 0738.*

* cited by examiner

Primary Examiner—John Breene
Assistant Examiner—Mohammad Ali
(74) Attorney, Agent, or Firm—Casimer K. Salys; Bracewell & Patterson, L.L.P.

(57) ABSTRACT

A method and system for automatically maintaining data consistency across two or more hierarchically arranged databases is disclosed. A master list and an environmental variable file are created for use in maintaining the data consistency of a cell view. A cell view in a selected database is then checked to see if it has been modified by performing date-time stamp shadowing. If the cell view is modified, the cell view is then retrieved by derivative lists created from the master list and the environmental variable file and translated based on criteria from the environmental variable file. Verification is then performed on the translated cell view once again based on criteria from the environmental variable file. This verification creates a signature for the translated cell view. Signatures are then checked for being out of date with respect to any dependency listing contained internally. Any signature found to be out of date triggers an automatic re-verification of the pertinent data file. The translated and verified cell view is then checked to see if it or any of its dependencies have been altered by performing an audit based on criteria from the environmental variable file using the signature. The translated and verified cell view is then promoted to a higher quality database based on the results of the audit.

19 Claims, 14 Drawing Sheets

```
!/bin/ksh

#This file defines ALL of the environment variables needed to completely
#drive software
#for the desired library

export LIBNAME=otslib_art
export AIXLIB=/nfs/ibmoto/otslib
export CKTLIB_MAKEFILES=/nfs/ibmoto/otslib/makefiles
export IL_CadenceDir=/nfs/ibmoto/otslib/cadence
CADENCE_SEARCHPATH="/nfs/ibmoto/otslib/cadence"
export CADENCE_SEARCHPATH
export QMAN_RTNHOME="/"
export PATH_NightAuwlbin=/home/wart/schaaf/NightAuwl/bin
PATH=${PATH_NightAuwlbin}:$PATH
export PATH=$PATH:/afs/ibmoto/tools/bit
export CKTLIB_SBOX=$AIXLIB/sbox
export CKTLIB_TEST=$AIXLIB/test
export CKTLIB_QFIX=$AIXLIB/qfix
export VERIF_DIR=$CKTLIB_SBOX/verify
export OFFICIAL_LIST=${CKTLIB_MAKEFILES}/${LIBNAME}.list
export IL_lib="$LIBNAME"
export IL_genericLib="otslib_art"
export IL_make_hdvsigsdir="$QMAN_RTNHOME/audit_sigs"
export IL_make_APRtestgl1dir=$CKTLIB_TEST/gl1
export IL_make_APRtestDEVdir=$CKTLIB_TEST/DEVICE
export APR_hdv_mergd_sigs=$VERIF_DIR/sigs/hdv/signatures
export APR_hdv_batchfile=$VERIF_DIR/sigs/hdv.bat
export APR_hdv_makedir=$CKTLIB_MAKEFILES/apr/hdv
export IL_make_aprhdv="$APR_hdv_makedir/makefile"
export APR_config=/home/wart/schaaf/audit/control_files/m5x_integ/
config_r4s_customots
export APR_hdv_parms=/home/wart/schaaf/audit/control_files/m5x_integ/
parms_hdv_customots
```

Fig. 6

```
datefiles_layout directory contents
-rwxr-xr-x  1 schaaf  arthur   144 May 23 23:32 makefile
-rwxr-xr-x  1 chao    arthur    48 May 23 23:56 s.mkall
-rwxr-xr-x  1 schaaf  arthur    20 Feb 8 20:10 so_mux3n_a
-rwxr-xr-x  1 schaaf  arthur    20 Feb 8 20:10 so_mux3n_b
-rwxr-xr-x  1 schaaf  arthur    20 Feb 8 20:08 so_mux3n_bit_a
-rwxr-xr-x  1 schaaf  arthur    20 Feb 8 20:08 so_mux3n_bit_b
-rwxr-xr-x  1 schaaf  arthur    20 Feb 8 20:08 so_mux3n_bit_c
-rwxr-xr-x  1 schaaf  arthur    20 Feb 8 20:10 so_mux3n_c
```

Fig. 7

```
so_mux3n_a: so_mux3n_bit_a
    touch so_mux3n_a
so_mux3n_c: so_mux3n_bit_c
    touch so_mux3n_c
so_mux3n_b: so_mux3n_bit_b
    touch so_mux3n_b
```

Fig. 8

```
make so_mux3n_a
make so_mux3n_c
make so_mux3n_b
```

Fig. 9

```
/nfs/ibmoto/otslib/sbox/gl1_noshad/so_mux3n_a:../datefiles_layout/so_mux3n_a
   dumpgl1_lib so_mux3n_a otslib_art
/nfs/ibmoto/otslib/sbox/gl1_noshad/so_mux3n_b:../datefiles_layout/so_mux3n_b
   dumpgl1_lib so_mux3n_b otslib_art
/nfs/ibmoto/otslib/sbox/gl1_noshad/so_mux3n_c:../datefiles_layout/so_mux3n_c
   dumpgl1_lib so_mux3n_c otslib_art
```

Fig. 10

/audit_sigs/so_mux3n_a/lp/signatures:/nfs/ibmoto/otslib/sbox/gl1/so_mux3n_a/nfs/ibmoto/otslib/sbox/DEVICE/so_mux3n_a
mkhdvrun-l otslib_art so_mux3n_a
/audit_sigs/so_mux3n_a/gr/signatures:/nfs/ibmoto/otslib/sbox/gl1/so_mux3n_a/nfs/ibmoto/otslib/sbox/DEVICE/so_mux3n_a
mkhdvrun-g otslib_art so_mux3n_a
/audit_sigs/so_mux3n_a/bm/signatures:/nfs/ibmoto/otslib/sbox/gl1/so_mux3n_a/nfs/ibmoto/otslib/sbox/DEVICE/so_mux3n_a
mkhdvrun-b otslib_art so_mux3n_a
/audit_sigs/so_mux3n_a/sm/signatures:/nfs/ibmoto/otslib/sbox/gl1/so_mux3n_a/nfs/ibmoto/otslib/sbox/DEVICE/so_mux3n_a
mkhdvrun-s otslib_art so_mux3n_a
/audit_sigs/so_mux3n_b/lp/signatures:/nfs/ibmoto/otslib/sbox/gl1/so_mux3n_b/nfs/ibmoto/otslib/sbox/DEVICE/so_mux3n_b
mkhdvrun-l otslib_art so_mux3n_b
/audit_sigs/so_mux3n_b/gr/signatures:/nfs/ibmoto/otslib/sbox/gl1/so_mux3n_b/nfs/ibmoto/otslib/sbox/DEVICE/so_mux3n_b
mkhdvrun-g otslib_art so_mux3n_b
/audit_sigs/so_mux3n_b/bm/signatures:/nfs/ibmoto/otslib/sbox/gl1/so_mux3n_b/nfs/ibmoto/otslib/sbox/DEVICE/so_mux3n_b
mkhdvrun-b otslib_art so_mux3n_b
/audit_sigs/so_mux3n_b/sm/signatures:/nfs/ibmoto/otslib/sbox/gl1/so_mux3n_b/nfs/ibmoto/otslib/sbox/DEVICE/so_mux3n_b
mkhdvrun-s otslib_art so_mux3n_b
/audit_sigs/so_mux3n_c/lp/signatures:/nfs/ibmoto/otslib/sbox/gl1/so_mux3n_c/nfs/ibmoto/otslib/sbox/DEVICE/so_mux3n_c
mkhdvrun-l otslib_art so_mux3n_c
/audit_sigs/so_mux3n_c/gr/signatures:/nfs/ibmoto/otslib/sbox/gl1/so_mux3n_c/nfs/ibmoto/otslib/sbox/DEVICE/so_mux3n_c
mkhdvrun-g otslib_art so_mux3n_c
/audit_sigs/so_mux3n_c/bm/signatures:/nfs/ibmoto/otslib/sbox/gl1/so_mux3n_c/nfs/ibmoto/otslib/sbox/DEVICE/so_mux3n_c
mkhdvrun-b otslib_art so_mux3n_c
/audit_sigs/so_mux3n_c/sm/signatures:/nfs/ibmoto/otslib/sbox/gl1/so_mux3n_c/nfs/ibmoto/otslib/sbox/DEVICE/so_mux3n_c
mkhdvrun-s otslib_art so_mux3n_c

Fig. 11

```
/nfs/ibmoto/otslib/test/gl1/so_mux3n_a DEVICE:so_mux3n_a./audit_sigs/so_mux3n_a/gr/signatures\
                                                        /audit_sigs/so_mux3n_a/lp/signatures
echo'gl1:so_mux3n_a DEVICE:so_mux3n_a'>>/nfs/ibmoto/otslib/sbox/verify/sigs/hdv.bat
/nfs/ibmoto/otslib/test/DEVICE/so_mux3n_a./audit_sigs/so_mux3n_a/gr/signatures\
                                          /audit_sigs/so_mux3n_a/lp/signatures
echo'gl1:so_mux3n_a DEVICE:so_mux3n_a'>>/nfs/ibmoto/otslib/sbox/verify/sigs/hdv.bat
/nfs/ibmoto/otslib/test/gl1/so_mux3n_b./audit_sigs/so_mux3n_b/gr/signatures\
                                       /audit_sigs/so_mux3n_b/lp/signatures
echo'gl1:so_mux3n_b DEVICE:so_mux3n_b'>>/nfs/ibmoto/otslib/sbox/verify/sigs/hdv.bat
/nfs/ibmoto/otslib/test/DEVICE/so_mux3n_b./audit_sigs/so_mux3n_b/gr/signatures\
                                          /audit_sigs/so_mux3n_b/lp/signatures
echo'gl1:so_mux3n_b DEVICE:so_mux3n_b'>>/nfs/ibmoto/otslib/sbox/verify/sigs/hdv.bat
/nfs/ibmoto/otslib/test/gl1/so_mux3n_c DEVICE:so_mux3n_c./audit_sigs/so_mux3n_c/gr/signatures\
                                                        /audit_sigs/so_mux3n_c/lp/signatures
echo'gl1:so_mux3n_c DEVICE:so_mux3n_c'>>/nfs/ibmoto/otslib/sbox/verify/sigs/hdv.bat
/nfs/ibmoto/otslib/test/DEVICE/so_mux3n_c./audit_sigs/so_mux3n_c/gr/signatures\
                                          /audit_sigs/so_mux3n_c/lp/signatures
echo'gl1:so_mux3n_c DEVICE:so_mux3n_c'>>/nfs/ibmoto/otslib/sbox/verify/sigs/hdv.bat
```

Fig. 12

```
/nfs/ibmoto/otslib/sbox/gl1/so_mux3n_a:5:gr:GL1BXT=0:GL12GDS=0:PDRACULA=0:JXRUN=0:0:83140
9073:0:7:0:/audit_sigs/so_mux3n_a/gr/signatures_detail:95
/afs/ibmoto/rules/r4s/prod/hdv/common/viewTech.def:8:gr:0:8314090973:0:0:0:cksum:2687581577
/afs/ibmoto/rules/r4s/prod/hdv/gr/macGr.desc:8:gr:0:8314090973:0:0:0:cksum:2612766783
/afs/ibmoto/rules/r4s/prod/hdv/gr/macGr.1yr:8:gr:0:8314090973:0:0:0:cksum:710921445
/afs/ibmoto/rules/r4s/prod/hdv/gr/macGr.ops1:8:gr:0:8314090973:0:0:0:cksum:3847495577
/afs/ibmoto/rules/r4s/prod/hdv/gr/macGr.ops3:8:gr:0:8314090973:0:0:0:cksum:3666353348
/afs/ibmoto/rules/r4s/prod/hdv/gr/macGr.ops_6s:8:gr:0:8314090973:0:0:0:cksum:3957340504
/afs/ibmoto/rules/r4s/prod/hdv/gr/end.ops:8:gr:0:8314090973:0:0:0:cksum:1659661439
```
— 112

Fig. 15

```
/audit_sigs/so_mux3n_a/gr/signatures::/nfs/ibmoto/otslib/sbox/gl1/so_mux3n_a\
/afs/ibmoto/rules/r4s/prod/hdv/common/viewTech.def\
/afs/ibmoto/rules/r4s/prod/hdv/gr/macGr.desc\
/afs/ibmoto/rules/r4s/prod/hdv/gr/macGr.1yr\
/afs/ibmoto/rules/r4s/prod/hdv/gr/macGr.ops1\
/afs/ibmoto/rules/r4s/prod/hdv/gr/macGr.ops3\
/afs/ibmoto/rules/r4s/prod/hdv/gr/macGr.ops_6s\
/afs/ibmoto/rules/r4s/prod/hdv/gr/end.ops
mkhdvrun-g otslib_art so_mux3n_a
```
— 122

Fig. 17

METHOD AND SYSTEM FOR AUTOMATICALLY MAINTAINING DATA CONSISTENCY ACROSS VARIOUS DATABASES

BACKGROUND OF THE INVENTION

1. Technical Field

The present invention relates in general to a method and system for automatically maintaining data consistency across various databases. Still more particularly, the present invention relates to a method and system for creating a single file to drive all translation, extraction, verification and promotion operations for maintaining data consistency across various databases in an automated fashion.

2. Description of the Related Art

Currently, circuit design data for integrated circuits is created utilizing several different databases. Because of the need to interface to various software programs, it is often necessary to manually translate the original data in a particular database to other data forms. Additionally, as the circuit design matures, it is frequently necessary to modify certain elements of the original design database. Therefore, it is extremely important to ensure that whatever change is made to the original database is propagated to the derived views. This problem becomes complicated when the original data is comprised of a plurality of individually alterable data records or cell views related to each other in a multiple hierarchical database system. Changes to anyone of the individual data records or cell views may have consequences that impact the integrity of the given hierarchy in which the changed data element of a cell view resides, or to a different but related hierarchical data set. It is frequently the case that a designer involved in a change to one or more data elements is unaware of the full consequences of this change.

In addition, it is desirable to know the quality of the data within a hierarchical database. Standards have been developed and encoded for use in quality control in the form of various software validation routines. However, when the database is changed, it is necessary to re-run these validation routines to ensure that no errors or undesirable qualities resulting in inconsistencies within the database has been introduced.

Consequently, it would be desirable to provide an improved method and system which is able to run independent of any operator intervention that guarantees data consistency across databases and activates software verification routines and performs the tasks necessary to indicate the quality of the data. The present invention solves all of these problems in a new and unique manner that has not been previously known in the art.

SUMMARY OF THE INVENTION

It is therefore one object of the present invention to provide an improved method and system for automatically maintaining data consistency across various databases.

It is another object of the present invention to provide an improved method and system that activates software verification routines and performs the tasks necessary to indicate the quality of the data as that is maintained across various databases.

It is yet another object of the present invention to provide an improved method and system for creating a single file to drive all translation, extraction, and verification and promotion operations for maintaining data consistency across various databases in an automated fashion.

The foregoing objects are achieved as is now described. A method and system for automatically maintaining data consistency across two or more hierarchically arranged databases is disclosed. A master list and an environmental variable file are created for use in maintaining the data consistency of a cell view. A cell view in a selected database is then checked to see if it has been modified by performing date-time stamp shadowing. If the cell view is modified, the cell view is then retrieved by derivative lists created from the master list and the environmental variable file and translated based on criteria from the environmental variable file. Verification is then performed on the translated cell view once again based on criteria from the environmental variable file. This verification creates a signature for the translated cell view. Signatures are then checked for being out of date with respect to any dependency listing contained internally. Any signature found to be out of date triggers an automatic re-verification of the pertinent data file. The translated and verified cell view is then checked to see if it or any of its dependencies have been altered by performing an audit based on criteria from the environmental variable file using the signature. The translated and verified cell view is then promoted to a higher quality database based on the results of the audit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 depicts an example of a environmental variable file for use in accordance with a preferred embodiment of the present invention;

FIGS. 7, 8 and 9 depict an example of an adjunct database directory showing a layout view and its make files for the master list of FIG. 5;

FIGS. 10, 11 and 12 depict examples of make files or database interface routines which use the master list of FIG. 5 for performing the translation, verification and audit and promote steps in accordance with the present invention;

FIG. 15, shows an example of the contents of a signature database produced from the verification routine depicted in FIG. 14;

FIG. 17, shows an example of the contents of a database produced from the signature synchronization routine depicted in FIG. 16;

DETAILED DESCRIPTION OF ILLUSTRATIVE EMBODIMENT

Figure 1:
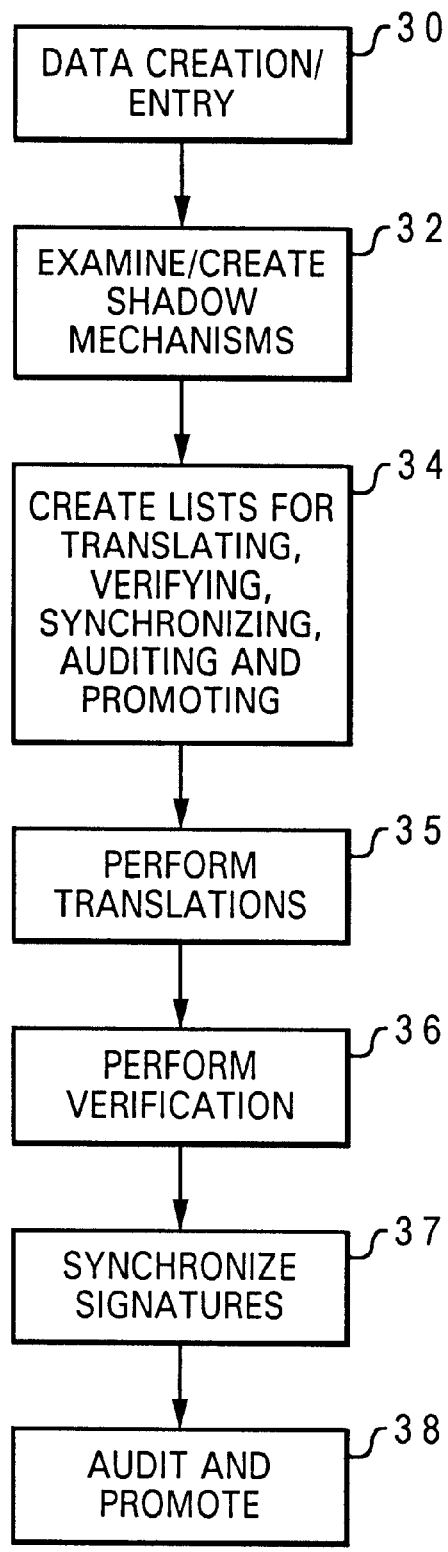
FIG. 1 depicts a high-level block diagram for automatically maintaining data consistency across two or more hierarchically arranged databases is accordance with the present invention.

With reference now to the figures and in particular with reference to FIG. 1, there is depicted a high-level block diagram for automatically maintaining data consistency across two or more hierarchically arranged databases is accordance with the invention recited within the appended claims. A master list and an environmental variable file are created for use in maintaining the data consistency of a cell view. As shown in block 30, a cell view is created by a designer and entered into a database. The cell view is then examined in block 32 to see if it has been modified by performing date-timestamp shadowing. If the cell view is modified, derivative lists are created from the combination of the master list and the environmental variable file in block 34 for use in maintaining the data consistency of the cell view. The cell view is then retrieved by the master list and the environmental variable file and translated based on criteria from the environmental variable file, as shown in block 36. Verification is then performed in block 35 on the translated cell view once again based on criteria from the environmental variable file. This verification creates a signature for the translated cell view. Signatures are then checked in block 36 for being out of date with respect to any dependency listing contained internally. Any signature found to be out of date triggers an automatic re-verification of the pertinent data file. The translated and verified cell view is then checked to see if it has been altered by performing an audit, shown in block 38 based on criteria from the environmental variable file using the signature. The translated and verified cell view is then promoted to a higher quality database based on the results of the audit. Each of these steps will now be explained in more detail below.

Figure 2:
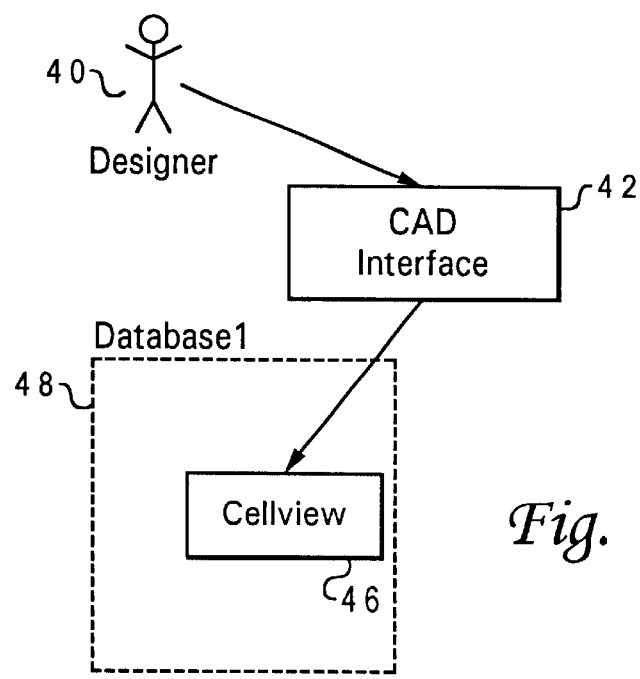
FIG. 2 illustrates a block diagram of a designer creating and entering a cell view within a database.
Figure 3:
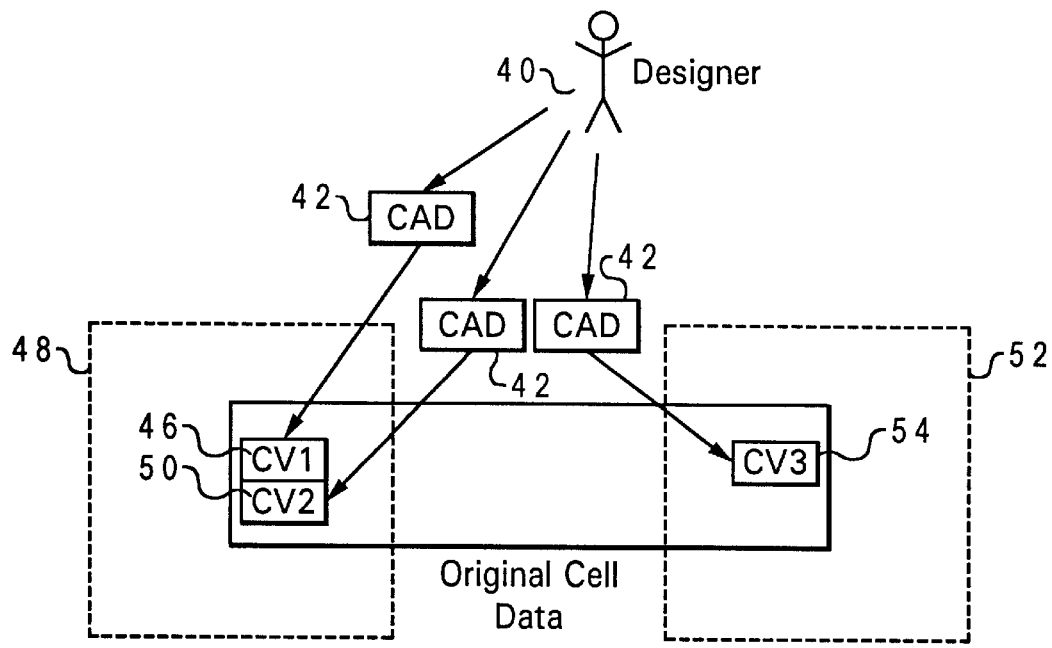
FIG. 3 shows an example of the situation when a designer using a CAD interface enters more than one view of a cell.

Referring now to FIG. 2, there is illustrated a block diagram for creating and entering a cell view within a database. In the development of a cell, a designer 40 first determines what type of cell needs to be created. A cell is a sub-classification within a database that refers to a collection of individual database objects known as cell views. The entire cell view collection is necessary to completely define a cell. At some point it becomes necessary to convert this knowledge into a form that is manipulatable by a computer system. Typically this is done via a CAD interface tool 42 which facilitates the design entry. The result is a cell view 46, which becomes stored in database1 48. This cell view 48 is part of what will be referred to as original data. Original data may consist of a collection of cell views 46, 50 and 54, all of which may or may not be a part of database1 48, but can, in general, include cell views in database2 52. FIG. 3 shows an example of the situation when a designer 40 using a Cad interface 42 enters more than one view of the cell.

Figure 4:
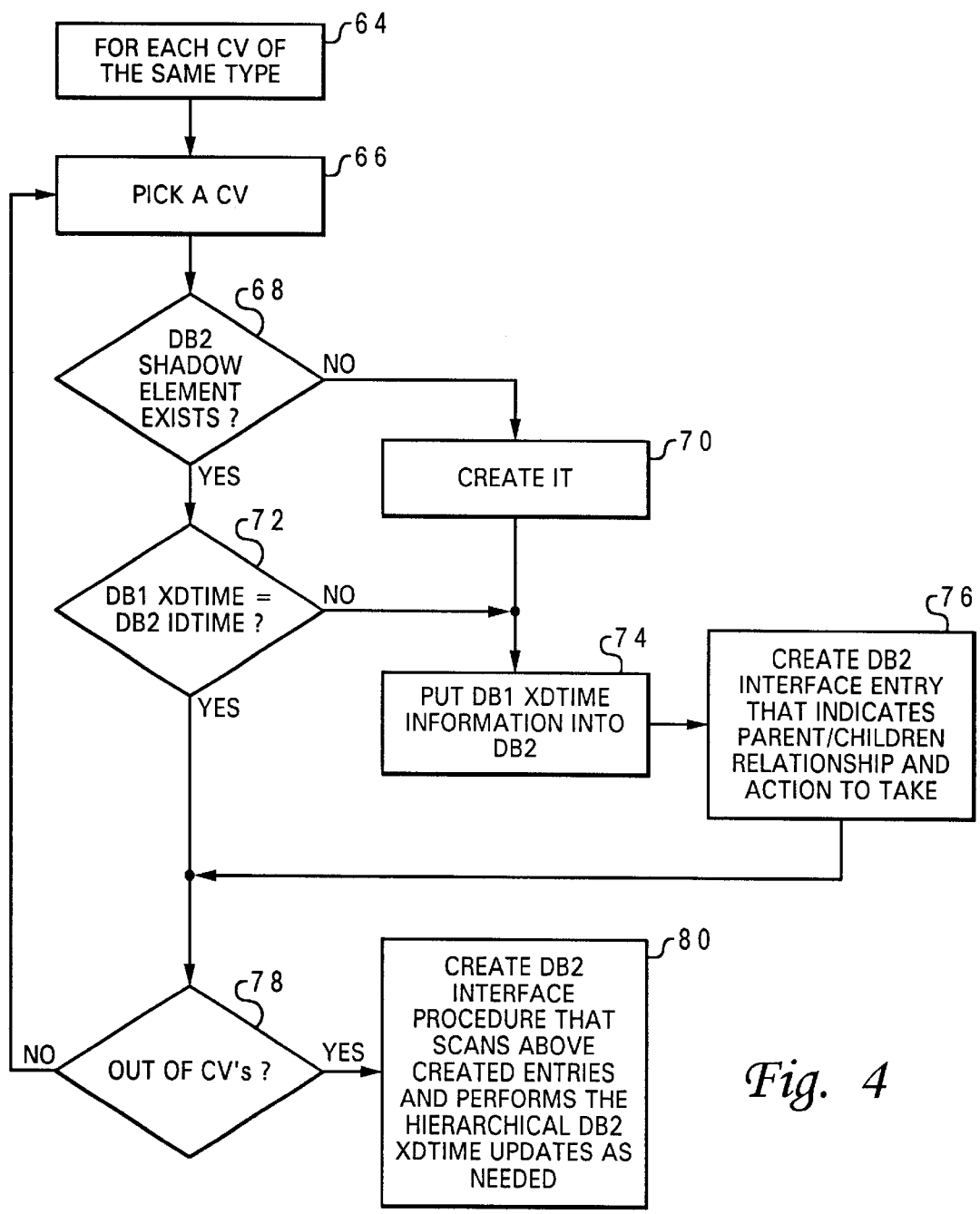
FIG. 4 shows one preferred embodiment of a high-level flowchart for date-timestamp shadowing.

After the cell views have been created, and entered, the method of the present invention then examines the cell views in the different databases 48 and 52 to determine if an existing cell view has been modified. As shown before in block 32 of FIG. 1, this may be performed by date-timestamp shadowing. Almost all database management systems contain some way of identifying when (date and time) data was entered and/or modified for any of the individual data elements within the database. The method of the present invention provides a software routine that bridges the gap between the two databases 48 and 52 as to when the data within the original data's database was modified. FIG. 4 shows one preferred embodiment of a high-level flowchart for date-timestamp shadowing. Referring now to FIG. 4, for each cell view of the same type, one cell view 54 is picked, as shown in steps 64 and 66. A separate area in the adjunct section of database2 52 is set up. In this area, separate database elements are created which contain nothing but the date-timestamp date for examination within database2 52, the internal and the external (shadowing). The internal date-timestamp is the contents of one of these database elements (that relate back to the data in database1 48). The external date-timestamp is the date-timestamp information maintained by database2's management system. This is the normal way database2 48 determines modification of data under its control regardless of the contents of the data element.

Therefore, referring once again to FIG. 4, database2 52 is checked in step 68 to see if a shadow element exists. If a shadow element exists, the external date-timestamp information for database1 48 is compared against the internal date-timestamp information of database2 52 for a change. If a change has occurred the external date-timestamp information of database1 48 is then placed into the internal date-timestamp information of database2 52. Additionally, if no shadow element existed in step 68, then a shadow element is created in step 70 with the external date-timestamp information of database1 48 being placed into the internal date-timestamp information of database2 52, also shown in step 74. The process then proceeds to step 76, wherein the database2 interface creates an entry indicating the hierarchical relationship and appropriate action to be taken at a later time for the cell view. After this task has been performed or if no change has been detected in step 72, the process proceeds to step 78 to determine if all the cell views have been examined, if not the process proceeds to step 66 and the next cell view is examined. If the process is finished, then in step 80 the created entries are scanned and a procedure is invoked which performs hierarchical updates as is necessary on the external date-timestamp information of database2 52.

Figure 5:
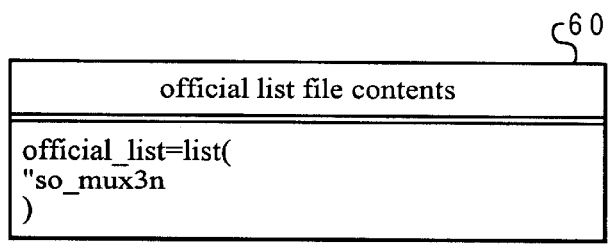
FIG. 5 depicts an example of a master list for use in accordance with a preferred embodiment of the present invention.

Once a cell view, and by way of example but not of limitation, cell view 46 in database 48 has been determined to be modified, derivative lists are created from the combination of the master list or "Official List" and the environmental file for translating, verifying, synchronizing, auditing and promoting the cell view 54, as shown in block 34 of FIG. 1. FIGS. 5 and 6, depict an example of an actual master or "Official" list and an environmental variable file for an implementation involved in a Cadence Design Framework II database management system in accordance with the method of the present invention. The master list 60 of FIG. 5, contains the global commands typed in by an operator or librarian responsible for keeping consistency among the various databases. The environmental variables file 62 of FIG. 6, contains a partial list of the export commands 56 used to communicate pertinent information to the subsequent routines that perform the various software tasks in accordance with the present invention.

Turning once again to FIG. 5, the master or "Official" list will make different entries in three different adjunct database directories. These directories correspond to three potentially different hierarchical organizations: layout, schematics and test views. By way of example, but not of limitation and since the hierarchy of the different trees is exactly the same in this particular case, the detailed example will concentrate on just the layout view 82 shown in FIG. 7. The directory listing 82 in FIG. 7 contains hierarchical information, the size of files, access permission codes, user names as well as file creation dates. FIGS. 8 and 9 are representative of the make files 84 and 86 contained in the directory listing 82, and are provided for illustration. Additionally, FIGS. 10, 11 and 12 depict examples of make files or database interface routines, 88, 90 and 92 respectively, which are derived from the master list 60 for performing the translation, verification and auditing and promote steps, as will be more fully described below.

Figure 13:
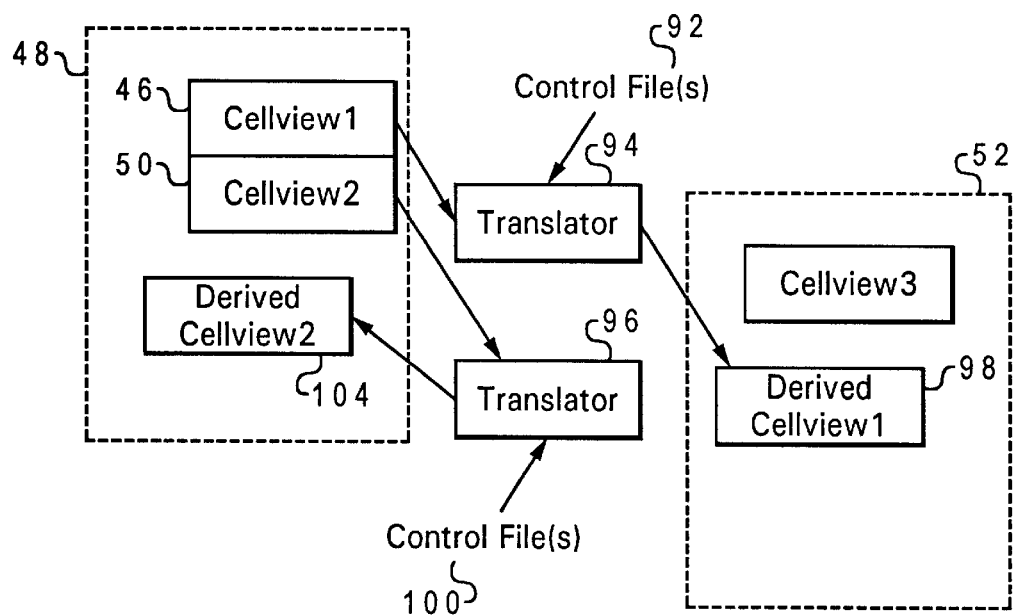
FIG. 13, depicts a block diagram for performing translation on the cell views depicted in FIG. 3.

Once the above-described files have been created, the cell view 46 is retrieved using the routines derived from the master list 60 and environmental variables file 62 and translation is performed, as shown in block 36 of FIG. 1. At some point in time, after some or all of the original data relating to a particular cell has been entered, it generally follows that derived data is created. Referring to FIG. 13, there is depicted a block diagram for performing translation on the cell views depicted in FIG. 3. The translator 94 takes the cell view 46 in database1 48 and creates a derived cell view1 98 placed in database2 52. Similarly, the translator 96 takes the cell view2 50 in database1 48 and creates a derived cell view2 104 and places it back in database2 48. These translators based their translations on the parameters defined in the environmental variable file 62. As shown in FIG. 13, control files 92 and 100 drive the way a translator performs its functions depending on a given technology. This translation is performed for all the cell views that have been found modified.

Figure 14:
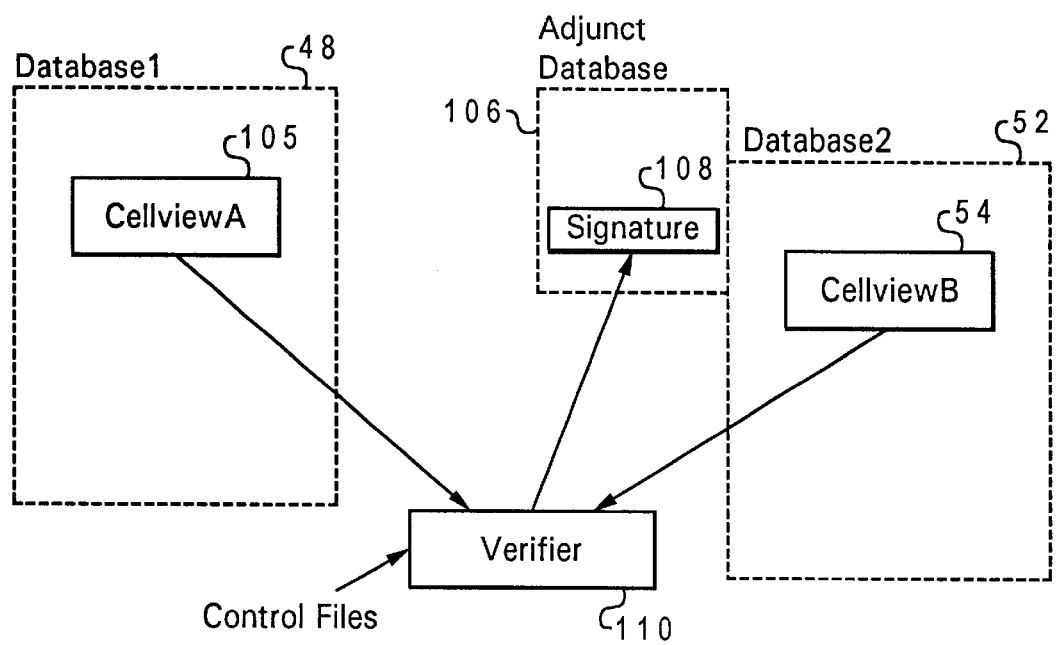
FIG. 14, shows a block diagram for performing the verification in accordance with a preferred embodiment of the invention.

During the above-described process and in accordance with the present invention, enough cell views will be created, that it will be possible to verify a certain aspect of the data's quality. Referring now to FIG. 14, a block diagram is shown for performing the verification in accordance with a preferred embodiment of the invention. A verifier 110 is activated which draws information from one or more cell views (cell view A 105 and cell view B 54) into the databases, 48 and 52 respectively, and, similar to the translation case, control files. The results of the verification are at a minimum a reason that gives a designer clues as to the corrective action necessary to fix problems detected in one or more of the cell views being verified. In formal database maintenance, when the verification is performed, a special cell view called a signature 108 is created in an adjunct database 106 that contains all of the information necessary to ascertain the validity and quality of the data at a later point in time, as will be more fully discussed below. This is necessary since other verification or translation operations may alter the data after it has been verified. The verifier 110 bases its verification methodology once again on the parameters defined in the environmental variable file 62.

Figure 16:
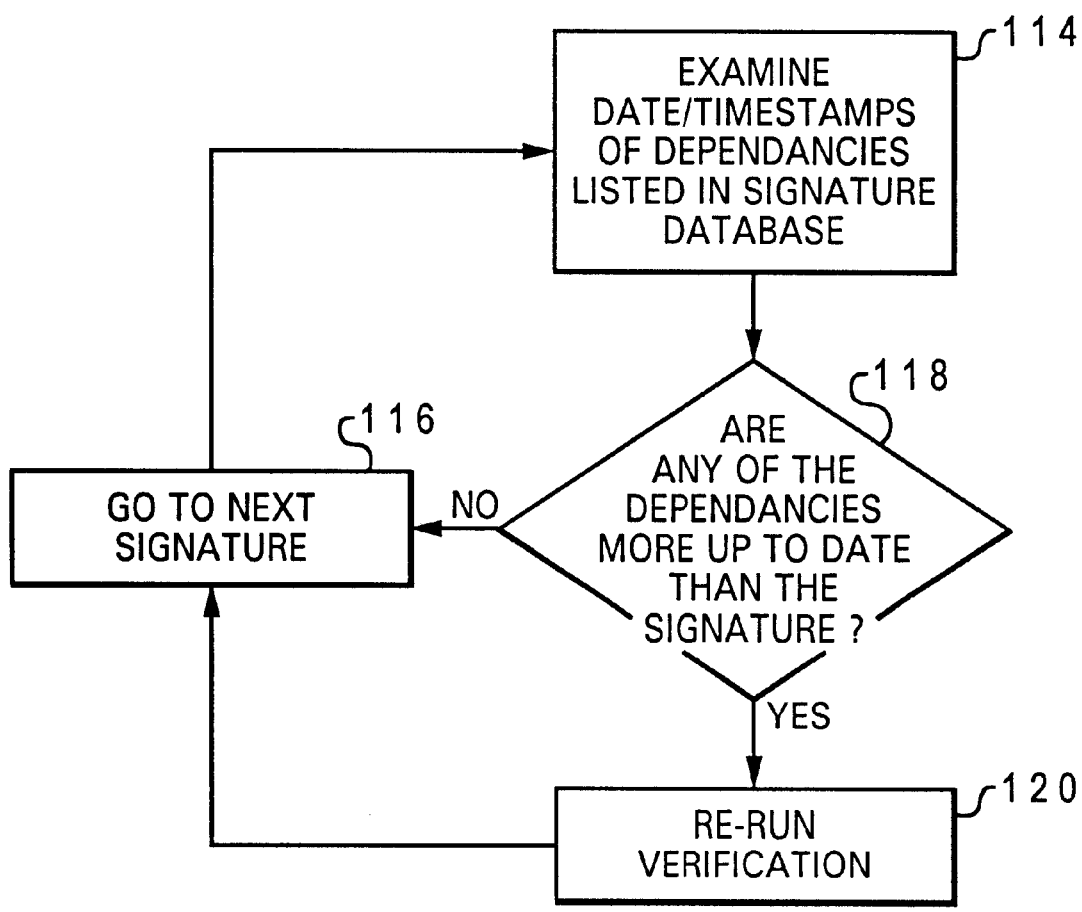
FIG. 16, shows a high-level flowchart for performing the signature synchronization in accordance with a preferred embodiment of the invention.

Next, after verification and in accordance with the present invention, signature synchronization is performed, as shown in block 36 of FIG. 1. Referring to FIG. 15, there is shown an example of the contents of a signature database 112 produced from the verification routine described above. This signature database 112 is used in the flowchart of FIG. 16 to synchronize the signatures. As shown, the signature database 112 contains not only a listing of the cell, but also its derived cell views (if it is hierarchical) and of the control files and other related ancillary data which was using part of a particular verification. The method of the present invention scans through this signature listing and builds a dependency listing 122 shown in FIG. 17 in the same manner as is done for verification. Turning once again to FIG. 16, the signature database 112 is examined for date/timestamps in step 114 to determine if any of the dependencies are more up to date than the signature in step 118. In the event that any of the dependencies are updated, a new verification is activated in step 120 resulting in a new, up to date signature database. If not, each signature is checked in step 116 until the process completes.

Figure 19:
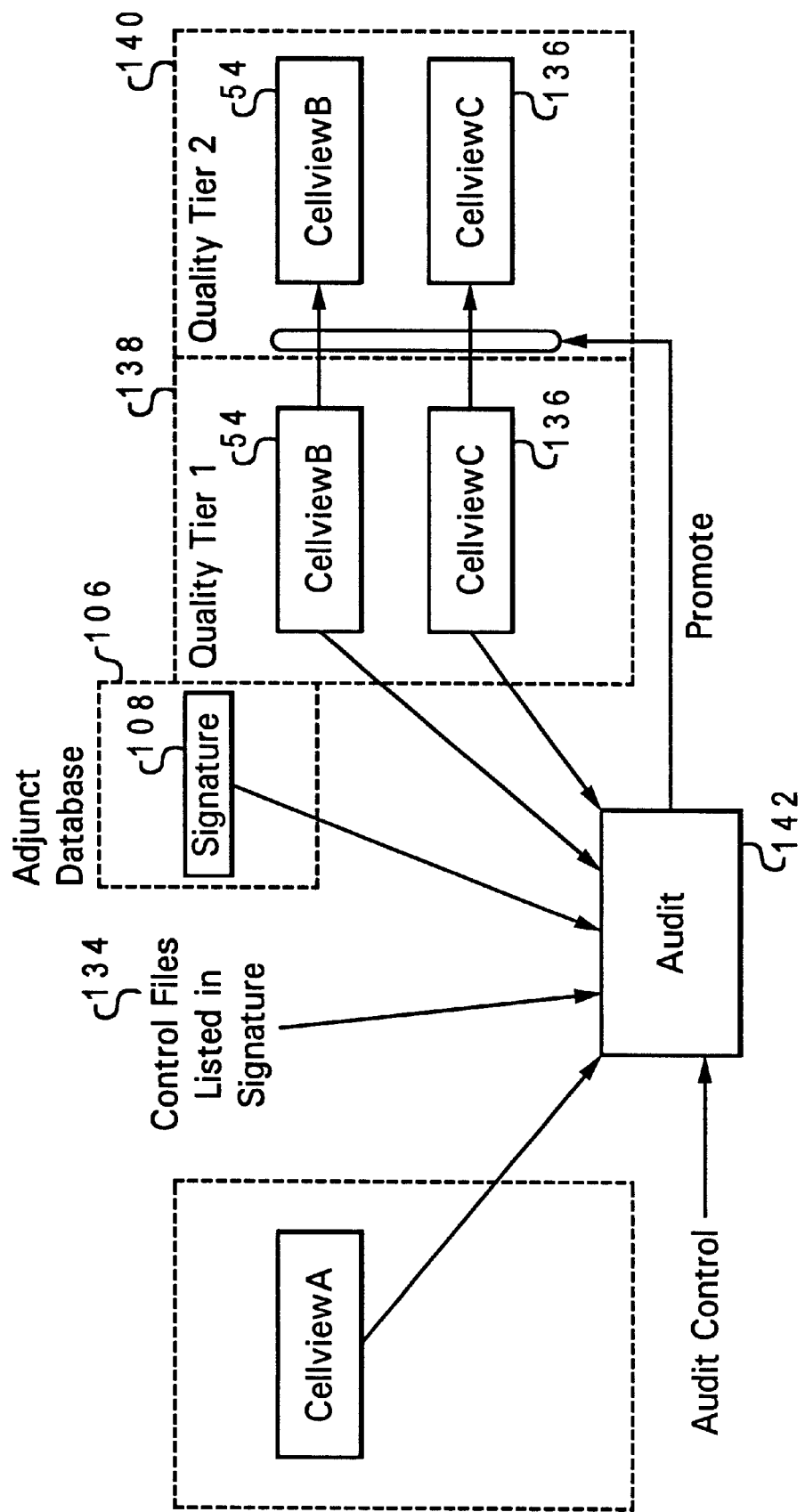
FIG. 19, depicts a block diagram for performing the audit and promotion routine shown in FIG. 18.

Once the layout verification and signature synchronization checks are complete, the audit and promotion verification step can be performed. Once again, this involves automatically placing the dependencies and commands to execute into the make file 90 shown in FIG. 11. In this case, the audit and promote procedure runs most efficiently when acting upon a group of files. Therefore, in order to determine whether or not the data has been altered. A special type of verifier is run called an audit and promote tool, as shown in block 38 of FIG. 1. Referring to FIG. 19, there is shown a high-level flowchart for performing the audit and promote routine. The process starts in step 124, by collecting all the signatures of the cell views into a merged set. Next, the cell views to be audited are determined based on the date/timestamps of the lower level signatures vs. the already promoted data pieces, as shown in step 126. The quality of the verification runs for these cells and the validity of dependencies involved in the runs as determined by the signature and audit control files are also checked next in step 128. After this filter process, each particular cell is checked to determine in step 130 if it passed the promotion criteria. If not, the process goes to the next cell on the list, as shown in step 134. However, if it did pass, the data in step 132 is copied to the next promotion level and a copy is created and entry made in a promotion database.

Figure 18:
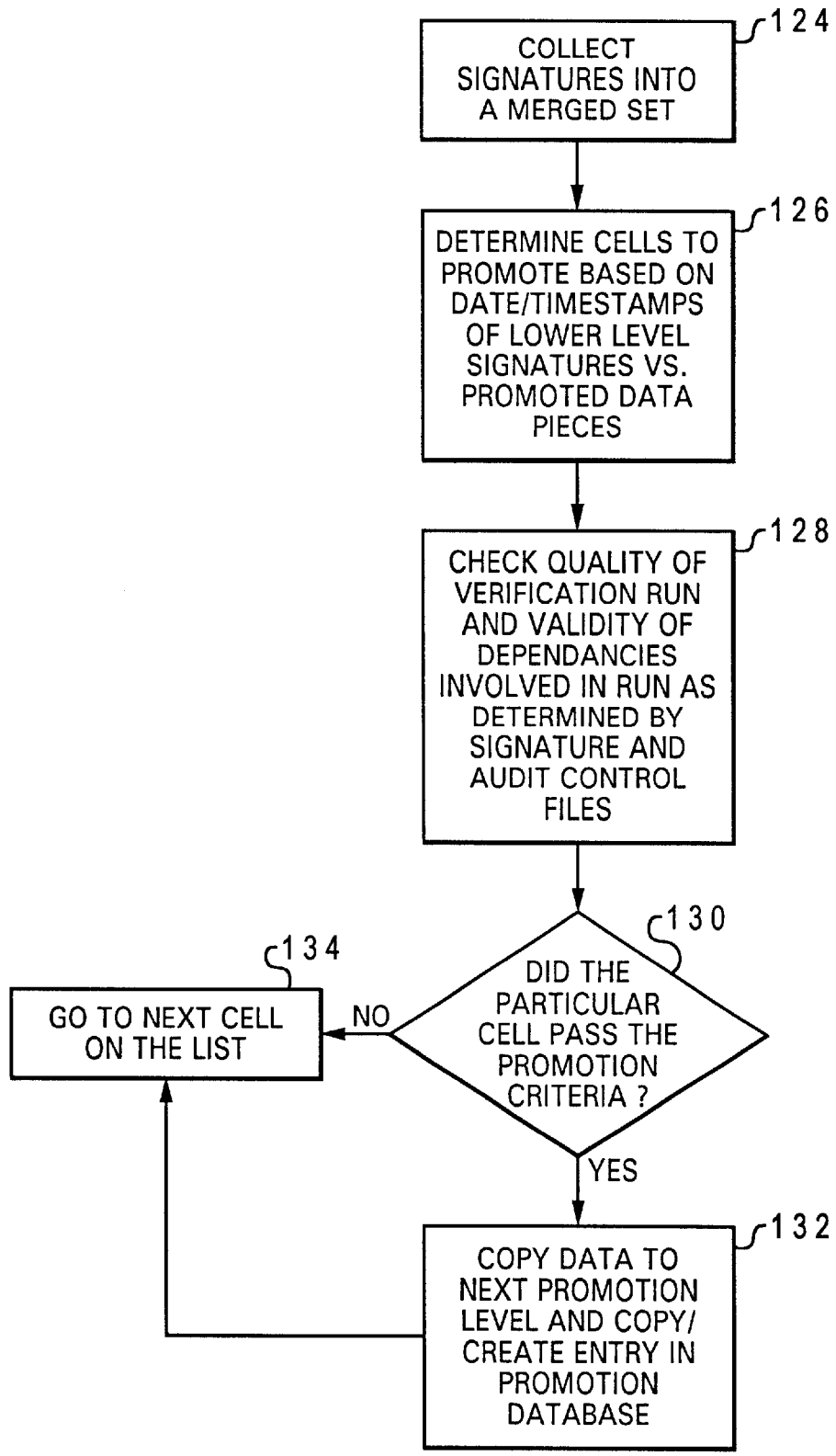
FIG. 18, shows a high-level flowchart for performing the audit and promotion routine in accordance with a preferred embodiment of the invention.

The flowchart process described in FIG. 18 is shown in block form in FIG. 19. Referring to FIG. 19, the signature 108 in adjunct database 106 is brought into the audit routine 142 for cell viewB 54 and cell viewC 136 of a database having a quality tier 138. If these cell views pass the criteria, they are passed up and into quality tier2 140. Note that control files listed for the signatures are used in this process. Therefore, after this tool determines that data has passed all of the required criteria, it activates the promotion process that essentially files a copy from one directory to another. This copy signifies the advancement of the data involved to a higher level.

Figure 20:
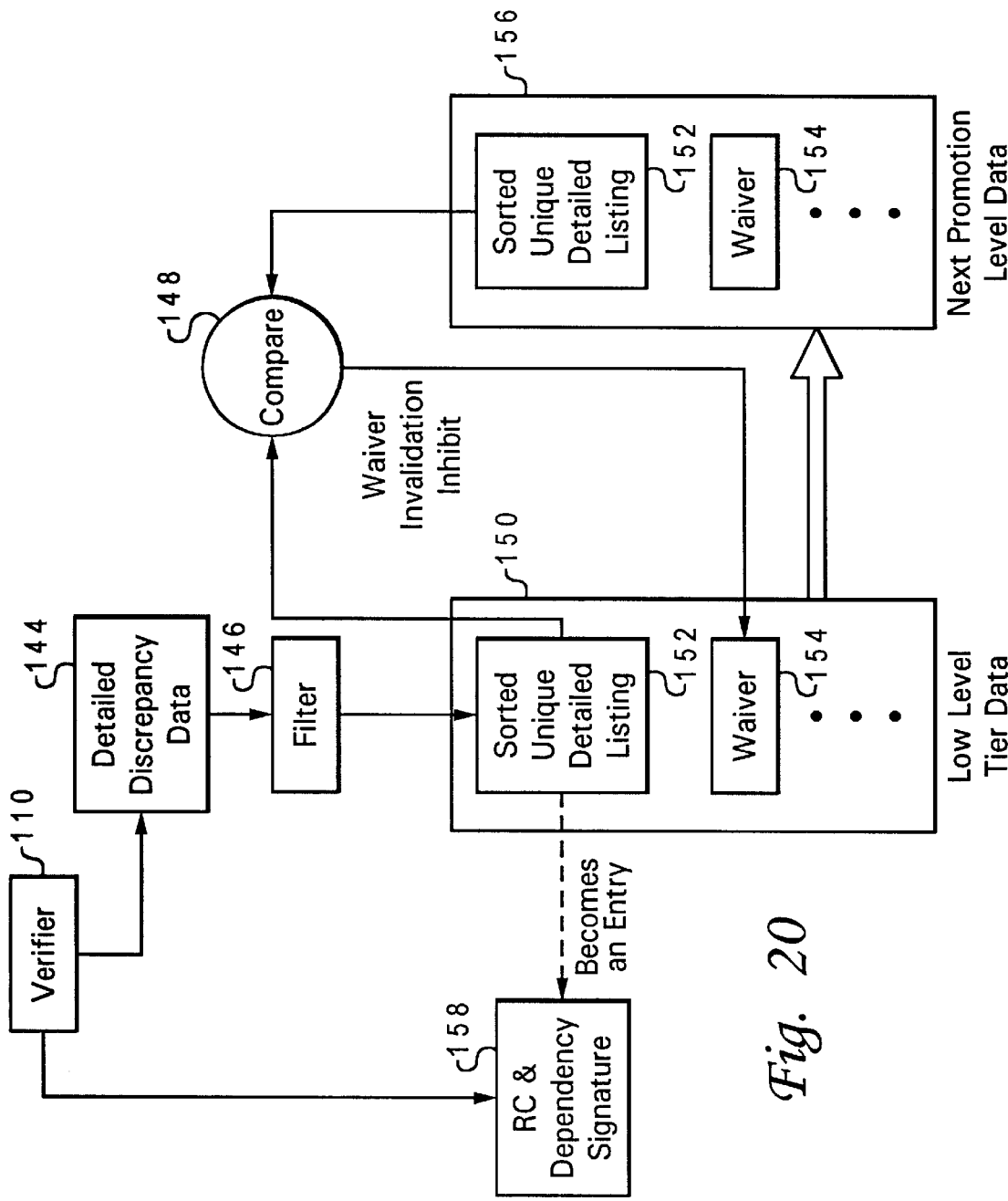
FIG. 20, there is depicted a block diagram for creating a waiver file for use during the verification process in accordance with the present invention.

Referring now to FIG. 20, there is shown a block diagram for enhancing the verification process by use of waiver files. During the verification process, problems are flagged which, upon close inspection by the designer, are determined to be acceptable. The designer may then create a waiver file 154 that describes the reasoning behind why this element should be allowed to be promoted. As shown in FIG. 20, the verifier 110 is started such that a detailed data file of the discrepancies is created in step 144 that is uncovered during the run. This file must be created such that detail information is available about every single discrepancy uncovered by the verifier 110. In order to provide standard results format, a filtering software mechanism at step 146 is used. This software examines the detailed discrepancy data and prepares another file 152 that will be a sorted unique detail listing and placed in a low level tier data location 150. Once a unique detailed listing is created, it is added to the signature database for verification in step 158 and ran back through the verifier 110. During the initial promotion when a waiver 154 was first created, this file 152 is promoted to the next tier 156. Upon subsequent promotion attempts, if the two sorted unique detailed listings at the different promotion levels are identical by using the compare function 148, then the process, which would have originally invalidated the original waiver, is inhibited. This allows automatic promotion if and only if the discrepancies flushed out by the second verification run are exactly the same as the original that had been allowed to promote via the waiver mechanism.

As described above, the method of the present invention automates the manual tasks of translation, verification and auditing though the use of a single file identified as the master or "official file". This works by going through the list of cells and developing a dependency/action listing suitable for execution at a later time. As present invention encounters each cell, it may be necessary to reference one or all of the databases for information pertinent to the dependency listing. In order to completely determine the specific nature of the dependent entry, reference is made to an environmental variable file that specifies the exact names, locations and other details of where it should come from and where it should go. Once all of the dependency/action lists are created, present invention scans through each of them in a rational sequence looking for data elements that are out of date. If something is stale, the appropriate action is executed and specified.

It is also important to note that although the present invention has been described in the context of a fully automatic means for maintaining data consistency across various databases, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for automatically maintaining data consistency across two or more hierarchically arranged databases, said method comprising the steps of:
    creating a master list and an environmental variable file for use in maintaining data consistency for a cell view;
    determining if said cell view in a selected database has been modified by performing date-timestamp shadowing;
    responsive to said determination, retrieving said cell view based on derivative lists created from said master list and said environmental variable file from said selected database;
    translating said cell view based on criteria from said environmental variable file;
    performing verification on said translated cell view based on criteria from said environmental variable file, said verification creating a signature for said translated cell view;
    determining if said translated and verified cell view has been altered by performing an audit based on criteria from said environmental variable file using said signature; and
    promoting said translated and verified cell view to a higher quality database among said two or more hierarchically arranged databases based on results of said audit.

2. The method according to claim 1, wherein performing date-time stamping further comprising the step of:
    comparing an external date-timestamp information for a first database against an internal date timestamp information of a second database to determine if said cell view has been modified.

3. The method according to claim 2, wherein performing date-time stamping further comprising the step of:
    creating internal date timestamp information for said first database by placing said external date-timestamp information from said second database into said first database when said first database does not have internal date timestamp information.

4. The method according to claim 2, wherein performing date-time stamping further comprising the step of:
    placing said external date-timestamp information from said second database into said internal date timestamp information for said first database when no modification has occurred.

5. The method according to claim 1, wherein translating said cell view further comprising the step of:
    driving said translating by a plurality of control files.

6. The method according to claim 1, wherein performing verification further comprising the step of:
    creating a signature database having dependencies for synchronizing said signature.

7. The method according to claim 6, creating said signature database further comprising the step of:
    updating said signature database by examining said dependencies in said signature database.

8. The method according to claim 1, promoting said cell view further comprising the step of:
    creating a detailed data file of discrepancies when performing said verification for producing a waiver file to further promote said cell view.

9. A system for automatically maintaining data consistency across two or more hierarchically arranged databases, comprising:
    means for creating a master list and an environmental variable file for use in maintaining data consistency for a cell view;
    means for performing date-timestamp shadowing to determine if said cell view in a selected database has been modified;
    means for retrieving said cell view based on derivative lists created from said master list and said environmental variable file from said selected database when said cell view has been modified;
    means for translating said cell view based on criteria from said environmental variable file;
    means for performing verification on said translated cell view based on criteria from said environmental variable file, said verification creating a signature for said translated cell view;
    means for determining if said translated and verified cell view has been altered by performing an audit based on criteria from said environmental variable file using said signature; and means for promoting said translated and verified cell view to a higher quality database among said two or more hierarchically arranged databases based on results of said audit.

10. The information handling system according to claim 9, comprising:

means for comparing an external date-timestamp information for a first database against an internal date timestamp information of a second database to determine if said cell view has been modified.

11. The information handling system according to claim 10, comprising:

means for creating internal date timestamp information for said first database by placing said external date-timestamp information from said second database into said first database when said first database does not have internal date timestamp information.

12. The information handling system according to claim 10, comprising:

means for placing said external date-timestamp information from said second database into said internal date timestamp information for said first database when no modification has occurred.

13. The information handling system according to claim 9, comprising:

means for driving said translating by a plurality of control files.

14. The information handling system according to claim 9, comprising:

means for creating a signature database having dependencies for synchronizing said signature.

15. The information handling system according to claim 14, comprising:

means for updating said signature database by examining said dependencies in said signature database.

16. The information handling system according to claim 10, comprising:

means for creating a detailed data file of discrepancies when performing said verification for producing a waiver file to further promote said cell view.

17. A computer program product residing on a computer usable medium for automatically maintaining data consistency across two or more hierarchically arranged databases, comprising:

instruction means for creating a master list and an environmental variable file for use in maintaining data consistency for a cell view;

instruction means for performing date-timestamp shadowing to determine if said cell view in a selected database has been modified;

instruction means for retrieving said cell view based on derivative lists created from said master list and said environmental variable file from said selected database when said cell view has been modified;

instruction means for translating said cell view based on criteria from said environmental variable file;

instruction means for performing verification on said translated cell view based on criteria from said environmental variable file, said verification creating a signature for said translated cell view;

instruction means for determining if said translated and verified cell view has been altered by performing an audit based on criteria from said environmental variable file using said signature;

instruction means for promoting said translated and verified cell view to a higher quality database among said two or more hierarchically arranged databases based on results of said audit; and instruction means for creating a detailed data file of discrepancies when performing said verification for producing a waiver file to further promote said cell view.

18. The computer program product according to claim 17, comprising:

instruction means for comparing an external date-timestamp information for a first database against an internal date timestamp information of a second database to determine if said cell view has been modified.

19. The computer program product according to claim 17, comprising:

instruction means for creating internal date timestamp information for said first database by placing said external date-timestamp information from said second database into said first database when said first database does not have internal date timestamp information.

* * * * *